Feb. 8, 1949.    C. H. JACOBSON    2,461,471
LATERAL FILM EDGE PRESSURE SPRING
Filed Oct. 1, 1947

INVENTOR.
Carl H. Jacobson
BY
ATTORNEY

Patented Feb. 8, 1949

2,461,471

UNITED STATES PATENT OFFICE 2,461,471

LATERAL FILM EDGE PRESSURE SPRING

Carl H. Jacobson, Binghamton, N. Y., assignor to General Aniline & Film Corporation, New York, N. Y., a corporation of Delaware Application October 1, 1947, Serial No. 777,280

10 Claims. (Cl. 88—17)

This invention relates to retractable guide means for an edge of a continuous strip during advancement thereof, and more particularly to an improved retractable film edge guide means for cinematographic film, especially in a film magazine of the type commonly employed in motion picture cameras.

In advancement of continuous strip material of self-sustaining character, such as film, paper, stiffened textiles or the like, it is often desired to provide guides for an edge of the strip to maintain it in the required location or alignment. Generally, it is also desired to provide for retraction of such guides, for example, during the threading of the strip through the device. Such guides should accordingly be readily and conveniently retractable at will, while at the same time resisting casual displacement from the strip guiding position during operation of the device, especially when the strip is inaccessible during such advancement.

A film magazine of the type commonly employed in motion picture cameras, particularly for amateurs, is a device in which retractable strip edge guides can be advantageously employed. Such magazines are adapted to be mounted in a camera for exposure of the film, and are also used for transporting the film to and from a loading and developing station. Such magazines include mechanism for advancing the film past an aperture or gate in a magazine wall through which light from the camera lens can be admitted for exposure of the film. Means including, for example, a runway pad, is provided for supporting the rear surface of the film, and along which the film is advanced, as well as the means for positioning the film in the focal plane of the lens as it passes the gate. In addition, means are provided for guiding the edge of the film to maintain it in constant alignment as it passes the gate, since variations in the alignment of the successive exposures or frames on the film would cause an unsteady picture when the film is used in a projector. Thus, fixed film edge engaging guides are generally provided for one edge of the film, arranged to support the film edge on opposite sides of the gate; while retractable guides advantageously adapted to yield slightly to compensate for minor variations in the width of the film are provided to engage the opposite film edge and to hold the film against the fixed film edge guides. The retractable film edge guides, when in operative position, generally extend beyond the edges of the runway pad on opposite sides of the gate, and are resilient so as to exert a slight pressure against the edge of the film during its advancement. They are preferably retractable, for example, to a position behind the runway pad, to facilitate loading of the magazine by insertion of the leading end of the film between the runway pad and magazine wall from one side of the magazine. When the film is thus inserted, the guides are moved back to operative film engaging position so as to hold the film in alignment during its advancement.

Since film magazines are generally loaded in a dark-room, it is desirable that the retractable film guides should be convenient to manipulate. Moreover, when said guides are returned to operative film guiding position, it is necessary that they remain in this position, resisting casual displacement from rough handling to which the magazine may be subjected during shipment, as well as displacement by engagement with a moving film during advancement thereof.

It is an object of my invention to provide improved strip edge engaging guides of exceedingly simple and economical construction, adapted to resist casual displacement from strip edge guiding position, and at the same time readily manipulated for retraction and return to operative position. More particularly, it is an object of my invention to provide such guides in a film magazine for motion picture cameras, whereby the desired resilient film guiding action is obtained, wherein the guides are reliably maintained in film guiding position during advancement thereof, and are readily manipulated in a darkroom to retract them for lateral insertion of a film and likewise to return them to film guiding adjustment.

In a preferred embodiment of the strip edge guides of my invention, I provide a pair of flat, elongated members, preferably of resilient material such as spring brass or steel, mounted on spaced pivots located adjacent to the path of the film or to the strip to be advanced, so that their free movable ends swing in a plane intersecting and preferably at right angles to that of the strip, each of said members extending from its own pivotal mounting toward the pivot of the other member between the pivotal supports, one of said members having an elongated aperture or slot therein, while the other member is of a width similar to that of said slot, so that the latter member is adapted to extend through the slot when the sides of the slot are aligned with the sides of the other member. In other words, the two members are shaped so as to be adapted mutually to intersect each other when mounted on their respective pivots and aligned in the aforesaid manner. The movable ends of the two members are thus disposed on the same side of the pivoted ends. respectively, at both pivotal mountings.

Means are provided for restricting movement of the ends of the two members to a plane at right angles with the pivot axes. For example, support means adjacent the pivots may be provided for holding the movable end of each member in surface contact with the pivoted end of the other member. Strip edge engaging guides extend laterally from the movable ends of the two members across the path of the strip when the sides of the slot in the slotted member are aligned with the edges of the other member extending through the slot. The intersecting engagement of the slotted member with the straight member thus maintains the two members in alignment during the strip advancing operation, by reason of engagement of the sides of the slot with the edges of the straight member extending therethrough.

In order to retract the two members, the sides of the slot yield resiliently in opposite directions, e. g., one flexing upward and the other downward, relative to the member extending through the slot, in order to permit movement of the members about their pivots to disaligned position. Neither of the two members can be retracted without at least some retractive movement of the other member. Once such flexure occurs, further retraction of the two members is not opposed by their slotted interengagement, and the two members can be conveniently moved by hand to the limit of their retraction.

When the two members are returned to aligned strip edge engaging position, the sides of the slot snap back into their original unflexed position to maintain the alignment of the two members, thus retaining them with yieldable detent action against casual displacement from strip guiding position.

Assembly of the members is readily accomplished even though their ends are considerably broader than their mid-portions, since the slot in the slotted member can be made as long as required to permit passage of the movable end of the opposite member therethrough by turning the latter sideways to the slot.

When the strip guiding means of my invention are incorporated in a film magazine of the type used in motion picture cameras, pivotal supports for the two members are advantageously disposed adjacent, and to the rear of, the runway pad on opposite sides of the gate. The two guide members pivotally mounted thereon swing about their pivots in a plane at right angles to the plane of the film or runway pad. Lateral film edge engaging projections on the movable ends of the two members extend across the runway pad, to make contact with the film edge on opposite sides of the gate when the two members are in operative position, wherein the sides of the slot of one member are aligned with the edges of the opposite member extending therethrough. The intersecting engagement of the two members in film guiding position provides adequate resistance against casual displacement from rough handling during shipment, as well as from engagement with the moving film. The movable ends of the two members preferably underlie the pivotal ends of the other members, respectively, said movable ends being slidably held between the pivotal end of the opposite member and a surface on the support of the pivot, so as to restrict movement of the film guiding ends of both members to the required plane, e. g., at right angles to the plane of the film or runway pad. In order to limit the retractive movement of the two members, their movable ends may have lost motion engagement with a fixed portion of the magazine; for example, each member may have a slot engaging a stud serving as the pivot for the opposite member, said slot defining the limits of pivotal movement.

In its preferred form, the guide means of my invention requires a minimum number of parts, is readily and cheaply manufactured as well as assembled with the other parts of a film magazine. Its manipulation can be conveniently and reliably carried out even in a darkroom. The detent action of the two members when moved to film guiding position, insures that the members will remain in said position during shipment as well as throughout the film advancing operation.

My invention will be more fully understood from the following description of a preferred embodiment thereof, taken in conjunction with the accompanying drawings, wherein.

Figure 1:
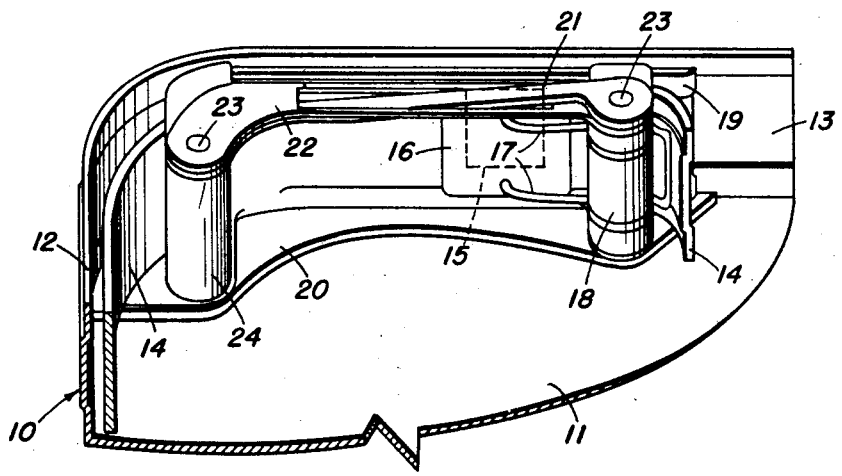
Fig. 1 is a perspective view of a portion of the interior of a film magazine including film guiding means in accordance with my invention.

Referring to the drawings, strip edge guide means of my invention is shown embodied in a film magazine 10 of the type commonly employed in motion picture cameras, having a side wall 11, an end wall 12 and a front wall 13. A runway pad 14 extends along the end wall 12 and front wall 13, past a gate or aperture 15 (location of which is indicated in dotted lines) in the front wall 13, said runway pad being adapted to support the rear surface of the film advanced thereover past said gate for exposure of successive portions of the film to illumination from the camera lens. A pressure pad 16, accessible through an aperture in the runway pad 14, is pressed forwardly by a spring 17 mounted on post 18, to hold the film against an aperture plate 19 carried by the front wall 13 and extending around the gate 15. The film passing between the pressure pad 16 of the aperture plate 19 is accurately positioned thereby in the focal plane of the camera lens.

One side of the runway pad 14 rests on a flat base plate 20 lying against the side wall 11 of the magazine 10, and extending to the front wall 13, said base plate presenting fixed film edge aligning and supporting surfaces to guide and align one edge of the film as it passes the gate 15.

Retractable film edge guide means in accordance with my invention comprises a pair of guide members 21 and 22 pivotally mounted respectively on studs 23 on the ends of posts 18 and 24 which extend outward from the side wall 11 of the magazine casing adjacent and to the rear of, the runway pad 14 on opposite sides of the gate 15. Said guide members 21 and 22 are pivotally mounted to swing toward and away from the front wall 13 in a plane at right angles to the film supporting surface of the runway pad 14.

Figure 2:
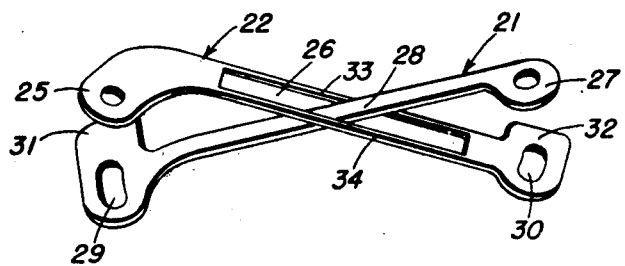
Fig. 2 is a perspective detail of the film guide members shown in Fig. 1.

The guide members 21 and 22 are preferably of normally flat resilient metal, member 22 having a curved end 25, perforated for mounting on stud 23 of post 24, while intermediate its ends the member 22 has a relatively wide slot 26 extending lengthwise of the member. Guide member 21 is likewise provided with a perforated end 27 for mounting said member pivotally on stud 23 of opposite post 18, mid-portion 28 of said member being of such width as to extend slidably facewise through slot 26 with at most slight clearance, in the manner shown in Fig. 2.

At their opposite or movable ends, members 21 and 22 are provided with arcuate slots 29 and 30, respectively adapted to engage studs 23 on posts 24 and 18, so as to limit pivotal movement of the members. Moreover, the movable ends of members 21 and 22 have lateral projections 31 and 32, respectively, which serve as film edge engaging portions on the two members. As shown in Fig. 1, the members 21 and 22 are assembled to intersect each other, member 21 passing through slot 26 of member 22, and are mounted with their ends in face-to-face contact, lying against the tops of posts 18 and 24, respectively, by means of studs 23 on the ends of posts. The movable ends of the two members, of which arcuate slots 29 and 30 engage studs 23, are slidably held between the pivotally mounted ends 25 and 27 and the tops of posts 18 and 24, whereby they are restricted to sliding movement in the desired plane at right angles to the film supporting surface of the runway pad 14. The lost motion engagement of arcuate slots 29 and 30 with studs 23 limits pivotal movement of the two members to the desired range between retracted and operative position.

When the edges of member 21 are aligned with the inner edges of slot 26, as shown in Fig. 1, film edge engaging projections 31 and 32 extend across the edge of runway pad 14 to engage the edge of the film supported thereby, and if desired, may extend to the front wall 13 of the casing. Film guiding projections 31 and 32 are thus positioned to engage the edge of the film and to hold its opposite edge against the fixed guide surface of the base plate 20, thus maintaining the film in constant alignment during its advancement past the gate 13. By constructing the members 21 and 22 of suitable resilient material, the guiding projections 31 and 32 can be readily arranged to exert slight pressure against the edge of the film and to flex for compensating for minor variations in the width of the film. Engagement of the edges of member 21 with the inner edges of slot 26 of member 22 retains the two members in mutual alignment and hence in film guiding position.

When it is desired to thread a new film around the runway pad 14 during loading of the magazine, guide members 21 and 22 are manually retracted about their pivots so as to withdraw projections 31 and 32 behind the film supporting surface of runway pad 14, such retraction being limited by engagement of the arcuate slots 29 and 30 with studs 23. Such retraction causes one side 33 of slot 26 to flex downward and the other side 34 to flex upward relative to member 21, in order to permit the two members to move out of alignment. The film can then be conveniently inserted from the open side of magazine 10 between runway pad 14 and wall 13, and also between pressure pad 16 and aperture plate 19. Members 21 and 22 are then pushed back to their original position wherein slot 26 is again aligned with the edges of member 21, the sides 33 and 34 of the slot 26 snapping back resiliently to parallel relation so as to hold the two members in aligned film guiding position. The retraction of the members 21 and 22, as well as their return to operative film guiding position, can be reliably and conveniently carried out without the aid of visual observation in order to load the magazine in a darkroom.

Assembly of members 21 and 22 is readily accomplished by making slot 26 long enough to receive the width of either end of member 21 so that the latter can be passed sideways through the slot, the width of slot 26 being made the same or substantially the same as the width of the mid-portion 28 of member 21.

Variations can be made in my invention without departing from the scope thereof. Thus, while the guide device of my invention has been described specifically as applied for guiding continuous film in a motion picture camera magazine, numerous applications can be found for said guiding means in other fields in which continuous strips, particularly of self-sustaining material or fabric, are advanced and wherein retractable guides for aligning an edge of such strips are desired. Similar advantages arising from the simplicity of the construction, and from the reliability and convenience of operation of my guiding device are realized in a similar manner.

I claim:

1. In a continuous strip advancing device, retractable strip edge guide means comprising a pair of flat, elongated guide members, pivotally mounted respectively at points adjacent to and spaced along the path of strip advancement with each member extending toward the pivot of the other member, so as to swing across the plane of said strip between an operative strip edge engaging position and an inoperative retracted position; one of said members having a slot intermediate said pivots and the other member extending through said slot; the sides of the slot being aligned with the edges of said other member when the two members are in operative position, and flexing in opposite directions relative to said other member upon movement of said members about their pivots to retracted position.

2. In a continuous strip advancing device, retractable strip edge guide means comprising a pair of flat, elongated, resilient guide members, pivotally mounted respectively at points adjacent to and spaced along the path of strip advancement with each member extending toward the pivot of the other member, so as to swing across the plane of said strip between an operative strip edge engaging position and an inoperative retracted position; one of said members having a slot intermediate said pivots and the other member extending through said slot; the sides of the slot being aligned with the edges of said other member when the two members are in operative position, and providing yieldable detent action resisting displacement of said members from operative position; and the sides of said slot flexing in opposite directions relative to said other member upon movement of the members about their pivots to retracted position, and returning resiliently to unflexed condition to restore said detent action upon movement of said members to aligned operative position.

3. In a continuous strip advancing device, retractable strip edge guide means comprising a pair of flat, elongated guide members, pivotally mounted respectively at points adjacent to and spaced along the path of strip advancement with each member extending toward the pivot of the other member, so as to swing across the plane of said strip between an operative strip edge engaging position and an inoperative retracted position; one of said members having a slot intermediate said pivots and the other member extending slidably through said slot, the sides of the slot being aligned with the edges of said other member when the two members are in operative position, and flexing in opposite directions relative to said other member upon movement of said members about their pivots to retracted position; and means restricting movement of the strip engaging portions of said members to a plane at right angles to the plane of the strip.

4. In a continuous strip advancing device, retractable strip edge guide means comprising a pair of flat, elongated guide members, pivotally mounted respectively at points adjacent to and spaced along the path of strip advancement with each member extending toward the pivot of the other member, so as to swing across the plane of said strip between an operative strip edge engaging position and an inoperative retracted position; one of said members having a slot intermediate said pivots and the other member extending slidably through said slot, the sides of the slot being aligned with the edges of said other member when the two members are in operative position, and flexing in opposite directions relative to said other member upon movement of said members about their pivots to retracted position; and means on the movable end of each of said members cooperating with the pivot of the opposite member for limiting pivotal movement of said members.

5. In a continuous strip advancing device, retractable strip edge guide means comprising a pair of flat, elongated guide members, pivotally mounted respectively at points adjacent to and spaced along the path of strip advancement with each member extending toward the pivot of the other member, so as to swing across the plane of said strip between an operative strip edge engaging position and an inoperative retracted position; one of said members having a slot intermediate said pivots and the other member extending slidably through said slot, the sides of said slot being aligned with the edges of said other member when the two members are in operative position, and flexing in opposite directions relative to said other member upon movement of said members about their pivots to retracted position; and means for holding the movable end of each of said members in sliding surface contact with the pivoted end of the opposite member, said means restricting movement of said members to a plane at right angles to the plane of said strip.

6. In a continuous strip advancing device, retractable strip edge guide means comprising a pair of flat, elongated, resilient guide members, pivotally mounted respectively at points adjacent to and spaced along the path of strip advancement with each of said members extending toward the pivot of the other member, each member having a strip engaging portion adjacent the pivot of the opposite member which swings across the plane of said strip between an operative strip edge engaging position and an inoperative retracted position; one of said members having a slot intermediate said pivots and the other member extending through said slot, the sides of the slot being aligned with the edges of said other member when the two members are in operative position, and providing yieldable detent action resisting displacement of said members from operative position; the sides of said slot flexing in opposite directions relative to said other member upon the movement of the members about their pivots to retracted position, and returning resiliently to unflexed condition to restore said detent action upon movement of said members to aligned operative position; a lost-motion connection between the movable end of each member and the pivot of the opposite member for limiting pivotal movement of said members; and means for holding the movable end of each of said members in sliding surface contact with the face of the pivoted end of the other member for restricting movement of said strip engaging portions to a plane at right angles to the plane of said strip.

7. In a film magazine for a motion picture camera having means for advancing a film in a fixed path adjacent to a gate for exposure of the film and fixed guide means for one edge of the film, retractable film edge guide means comprising a pair of flat, elongated, resiliently flexible guide members pivotally mounted respectively at points adjacent and to the rear of the path of said film on opposite sides of said gate, with each member extending toward the pivot of the other member, each member having a film edge engaging portion at the movable end thereof which swings across the edge of the path of the film opposite said fixed guide means upon pivotal movement of said member between an operative film edge engaging position and an inoperative retracted position; one of said members having a slot intermediate said pivots and the other member extending slidably through said slot, the sides of the slot being aligned with the edges of said other member when the two members are in operative position, and providing yieldable detent action resisting displacement of said members from operative position; the sides of said slot flexing resiliently in opposite directions relative to said other member upon movement of the members about their pivots to retracted position, and returning resiliently to unflexed condition to restore said detent action upon movement of said members to aligned operative position.

8. In a film magazine for a motion picture camera having a runway pad for supporting the rear surface of a film during advancement thereof adjacent to a gate for exposure of the film, and fixed guide means for one edge of the film, retractable film edge guide means comprising a pair of supports adjacent and to the rear of said runway pad on opposite sides of said gate; a pair of flat, elongated, resiliently flexible guide members pivotally mounted on said supports respectively, each member extending toward the pivot support of the other member and each having a film edge engaging portion at the movable end thereof which swings across the edge of said runway pad opposite said fixed guide means upon pivotal movement of said member between an operative film edge engaging position and an inoperative retracted position; one of said members having a slot intermediate said pivots and the other member extending slidably through said slot, the sides of the slot being aligned with the edges of said other member when the two members are in operative position, and providing yieldable detent action resisting displacement of said members from operative position; the sides of said slot flexing resiliently in opposite directions relative to said other member upon movement of the members about their pivots to retracted position, and returning resiliently to unflexed condition to restore said detent action upon movement of said members to said aligned operative position; and a guide surface on said supports for holding the movable end portions of each member slidably against the surface of the pivoted end of the other member, to restrict movement of said film edge engaging portions to a plane at right angles to the surface of the runway pad.

9. Retractable film edge guide means as defined in claim 8, wherein the movable end of each of said members has a lost-motion connection with the pivot of the opposite member defining the limits of pivotal movement between operative and retracted positions.

10. In a film magazine for a motion picture camera having a runway pad for supporting the rear surface of a film during advancement thereof adjacent a gate for exposure of the film, and fixed guide means for one edge of the film, retractable film edge guide means comprising a pair of posts extending outward from the side wall of said magazine adjacent and to the rear of said runway pad on opposite sides of said gate; a pair of flat, elongated, resiliently flexible guide members pivotally mounted on the ends of said posts, each member extending toward the pivot of the other member and each having a resilient lateral film edge engaging projection which swings across the edge of said runway pad opposite said fixed guide means upon pivotal movement of said member between an operative film edge engaging position and an inoperative retracted position; one of said members having a longitudinal slot intermediate said pivots, and the other member having a mid-portion of a width similar to that of the slot, and extending slidably through said slot, the sides of said slot being aligned with the edges of said other member when the two members are in operative position and providing yieldable detent action resisting displacement of said members from operative position; the sides of said slot flexing resiliently in opposite directions relative to said other member upon movement of said members about their pivots to retracted position, and returning to unflexed condition to restore said detent action upon movement of said members to aligned operative position; the movable end of each member lying between the end surfaces of said posts and the under surface of the pivoted end of the other member to restrict movement of said film edge engaging projections to a plane at right angles to the surface of the runway pad; and the movable ends of each member having a slot therein through which the pivot of the opposite member extends, forming a lost-motion connection determining the limits of pivotal movement between operative and inoperative positions.

CARL H. JACOBSON.

No references cited.